Dec. 15, 1970  W. L. WELLS  3,547,531
FILM READER
Filed May 7, 1968  8 Sheets-Sheet 2
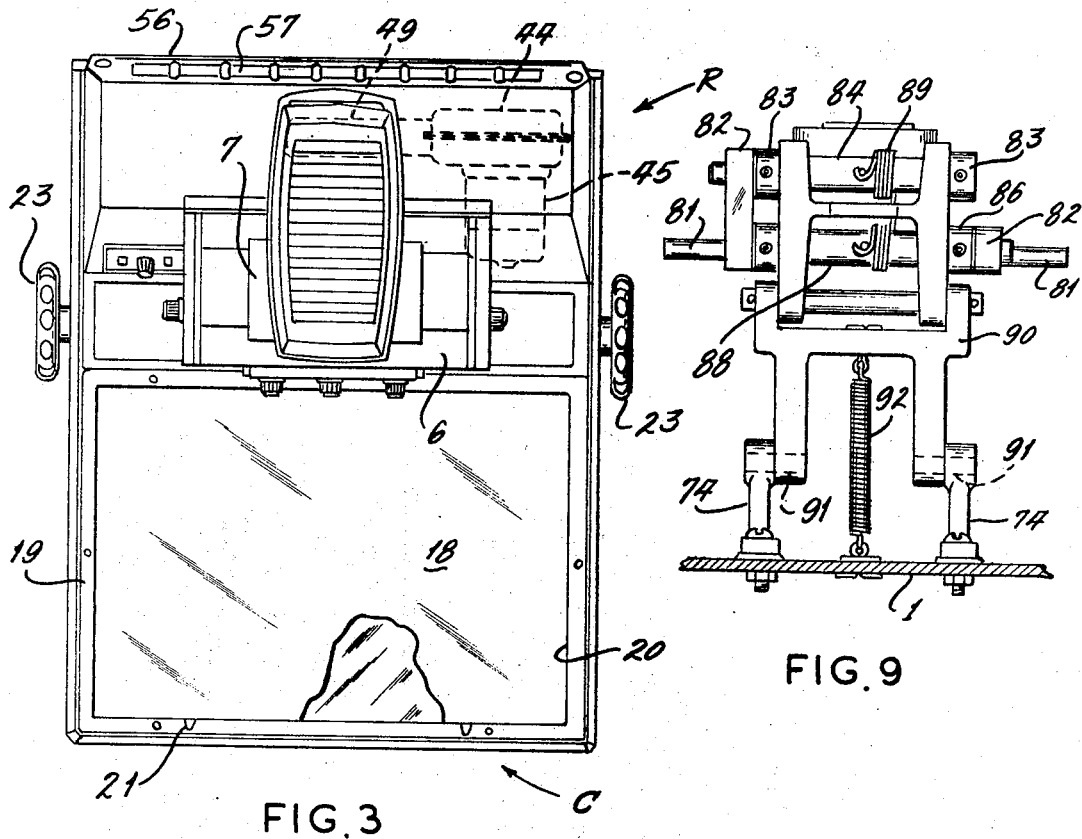
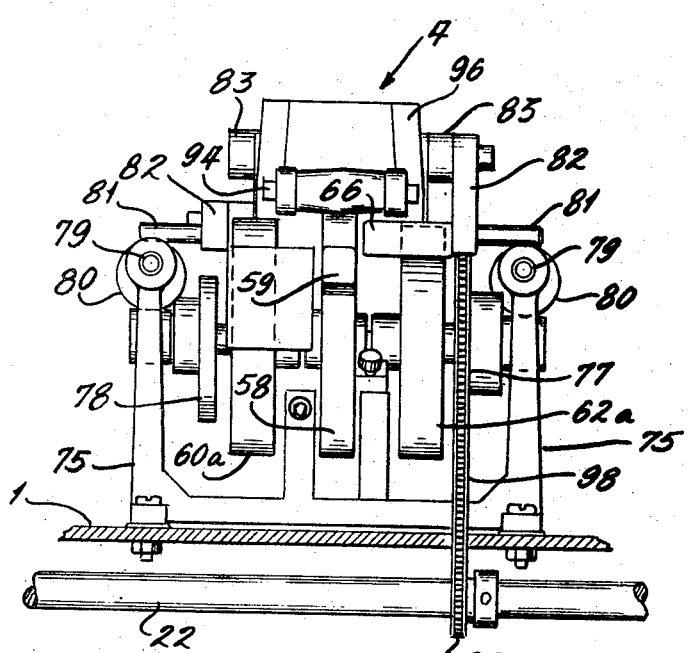
INVENTOR:
WILLIS L. WELLS
BY Gravely, Lieder & Woodruff
ATTORNEYS.

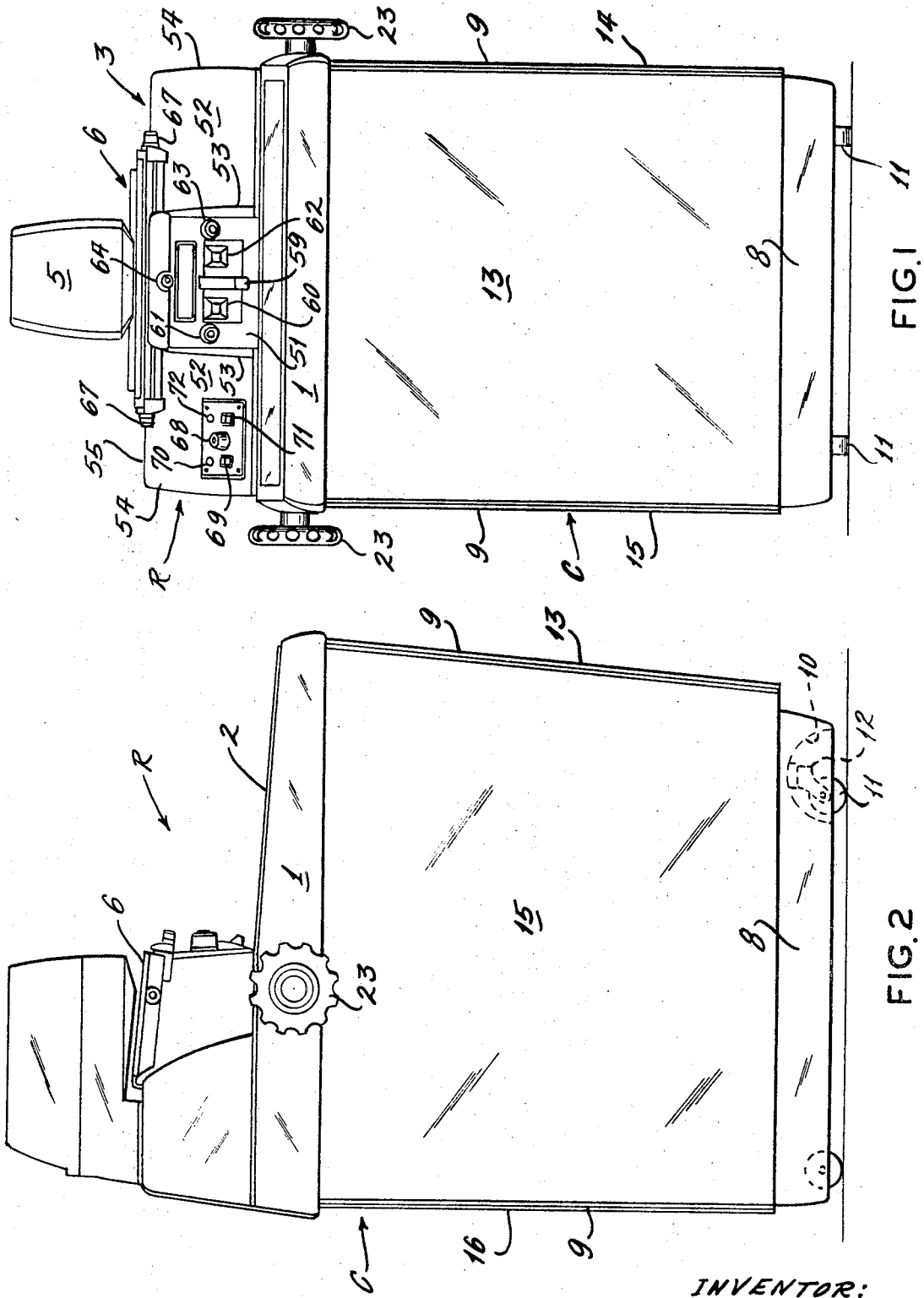

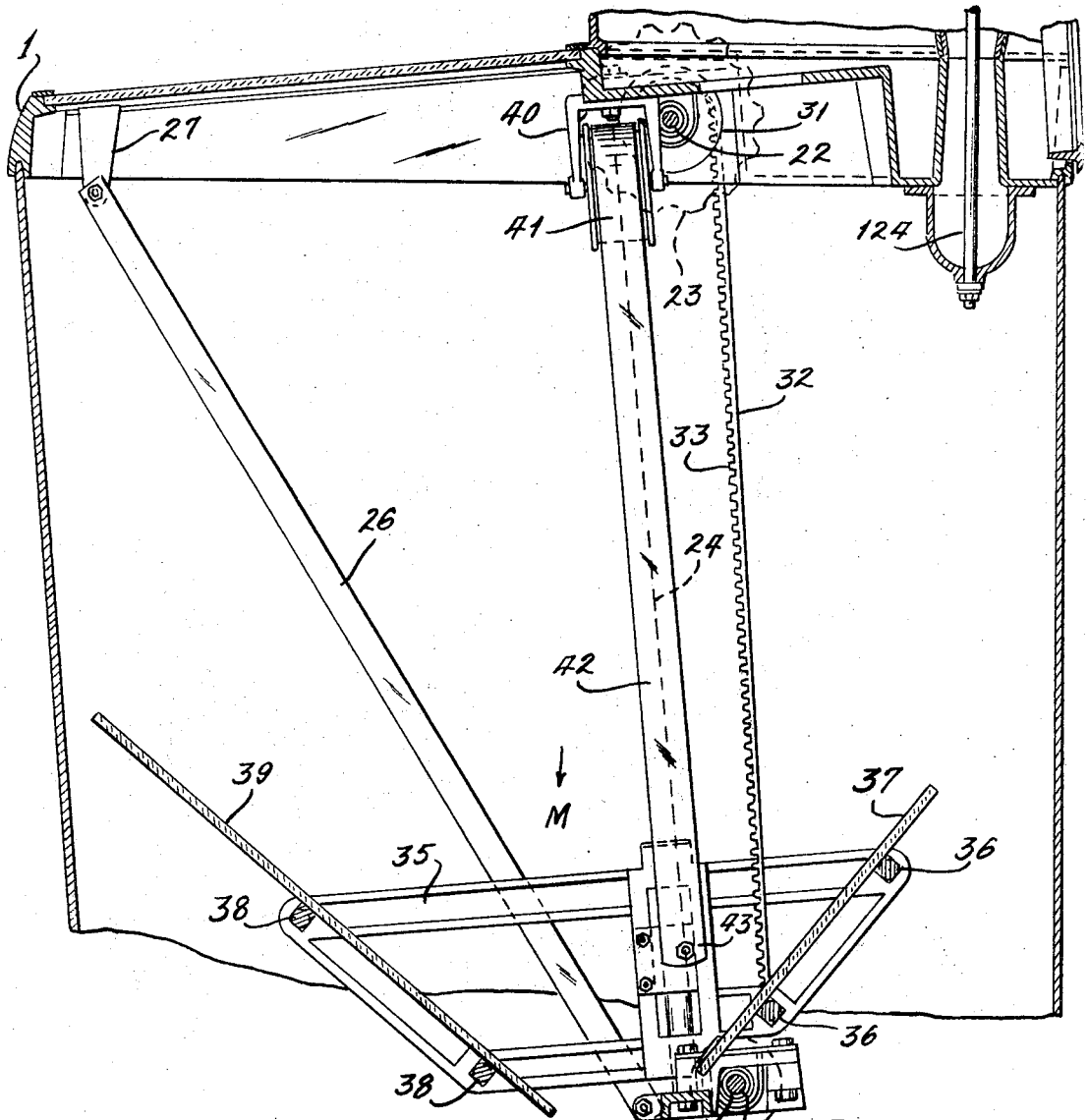
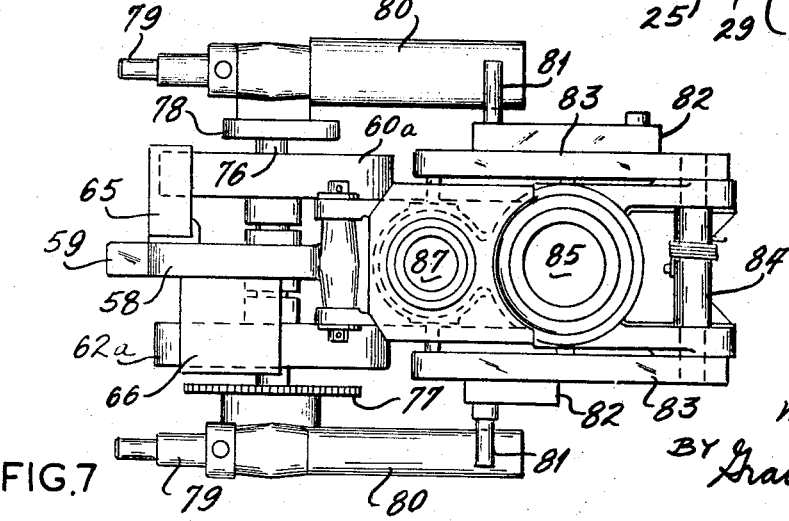
FIG 4
FIG. 7
INVENTOR:
WILLIS L. WELLS
BY Gravely, Lieder & Woodruff
ATTORNEYS.

INVENTOR:
WILLIS L. WELLS
BY Gravely, Lieder & Woodruff
ATTORNEYS.

Dec. 15, 1970     W. L. WELLS     3,547,531
FILM READER
Filed May 7, 1968     8 Sheets-Sheet 6
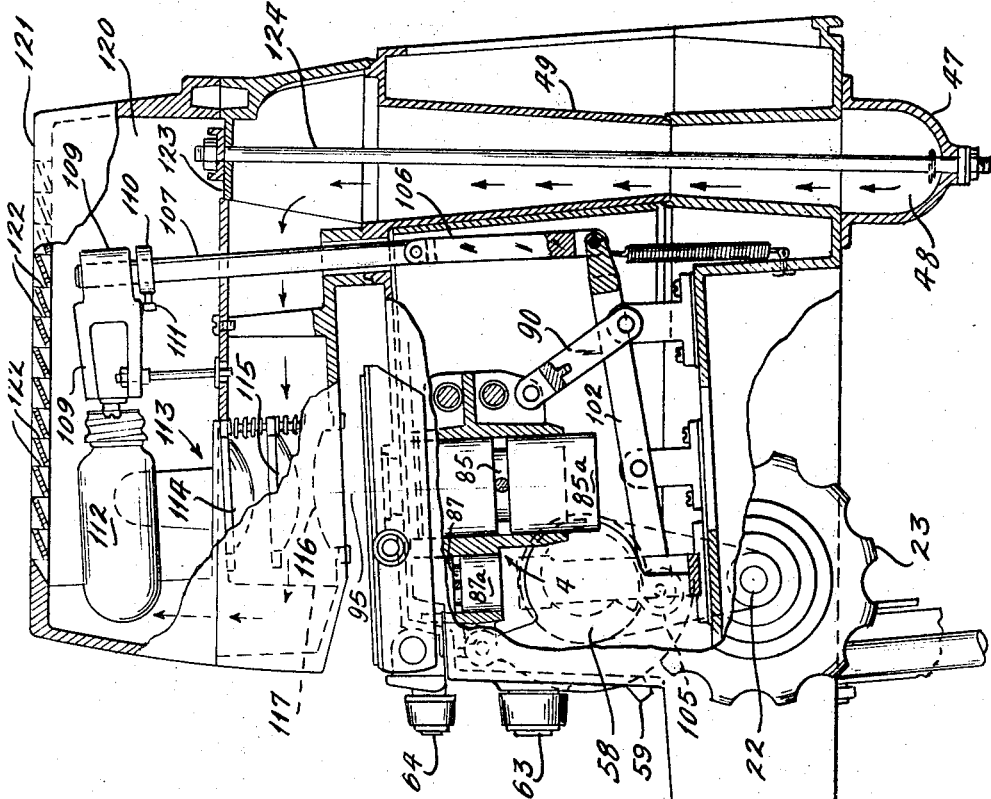
FIG.11
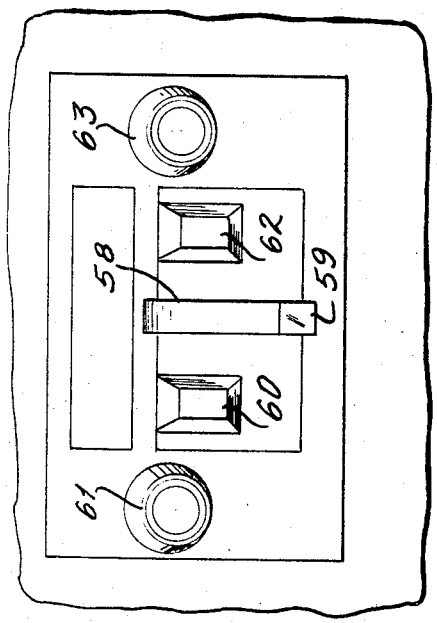
FIG.12
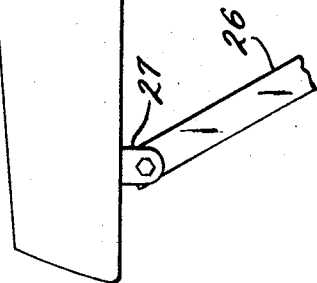
INVENTOR:
WILLIS L. WELLS
BY Gravely, Lieder & Woodruff
ATTORNEYS.

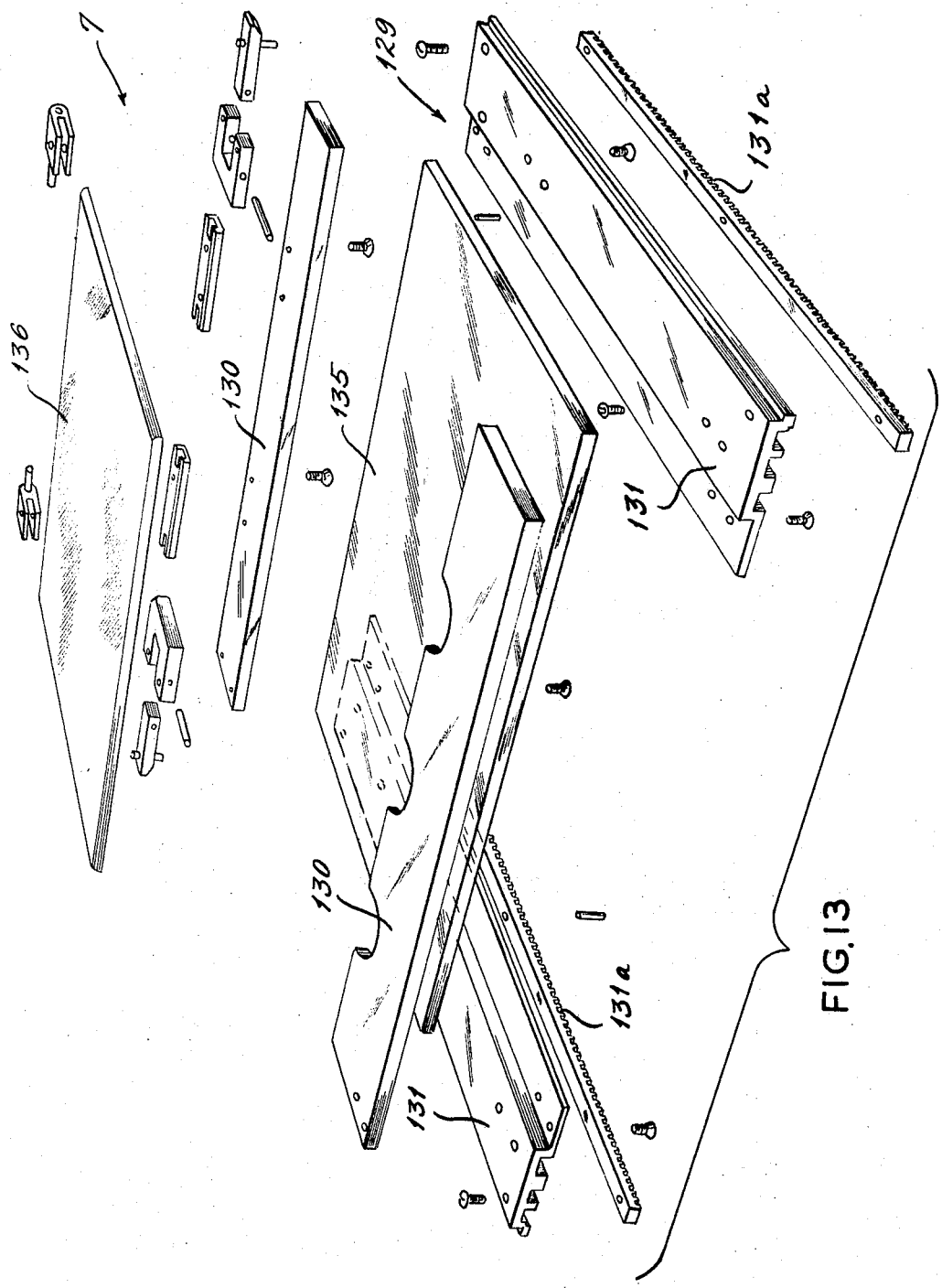

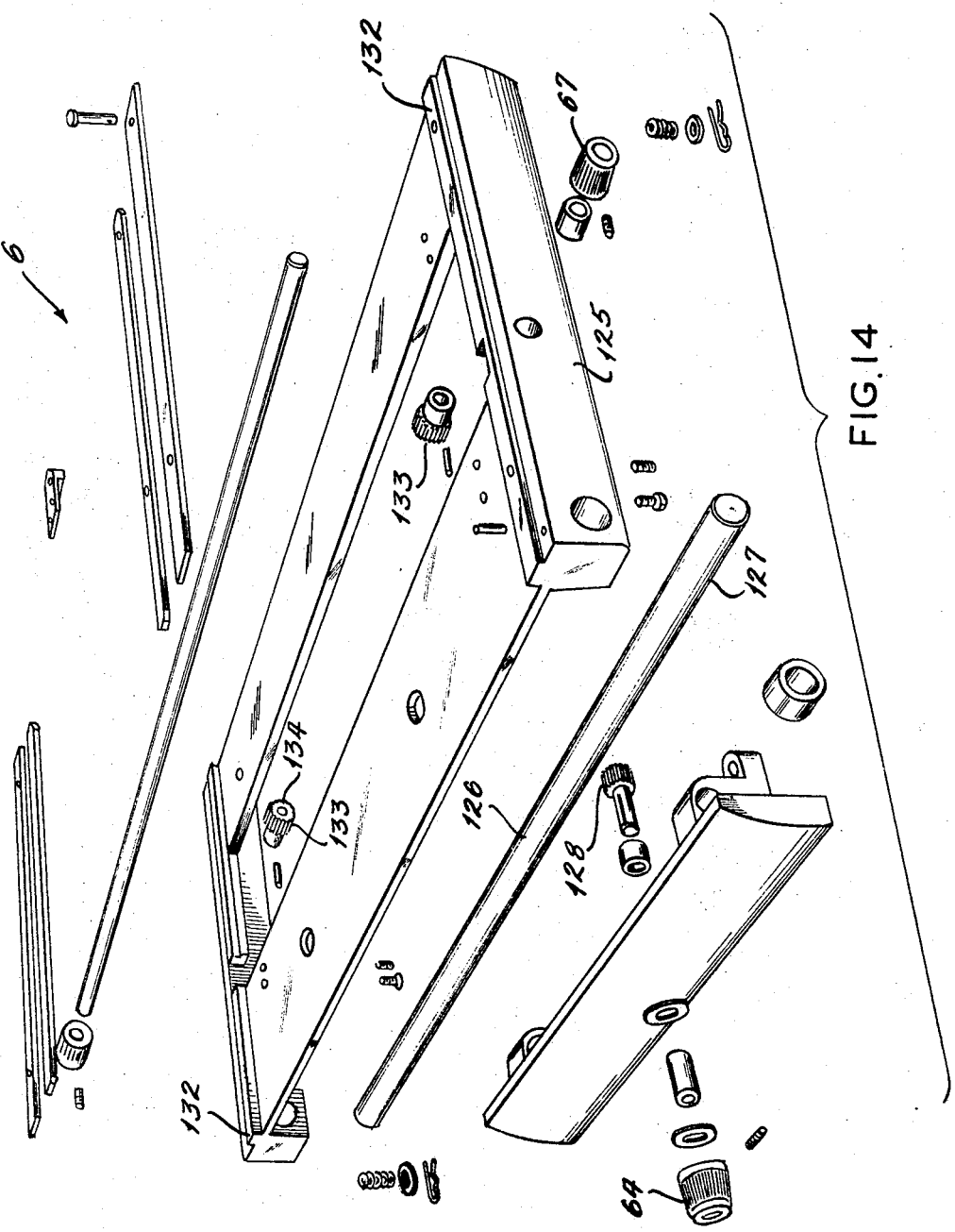

United States Patent Office 3,547,531
Patented Dec. 15, 1970

3,547,531
FILM READER
Willis L. Wells, Clayton, Mo., assignor to Photronix, Inc., St. Louis, Mo., a corporation of Missouri
Filed May 7, 1968, Ser. No. 727,217
Int. Cl. G03b *21/22*
U.S. Cl. 353—76
4 Claims

ABSTRACT OF THE DISCLOSURE

A film viewer having means therein for providing a plurality of magnifications of the microfilm, said means including a plurality of lenses and a specific and inexpensive arrangement for raising and lowering the mirrors within said viewer, and a novel tie-rod arrangement for the cover of the viewer, and a novel formation of the cooling air passages.

---

This invention relates generally to film readers, and more particularly, to a film reader wherein the image from microfilm is projected on a larger surface which can be viewed by architects and engineers, and the like, and wherein a portion of said image can be magnified to a greater extent by movement of control means.

The present film reader is a companion piece or in some instances a substitute for the film reader shown in my co-pending patent application Ser. No. 483,950, filed Aug. 31, 1965, now U.S. Pat. No. 3,381,574 granted May 7, 1968.

In the past, there have been numerous kinds of film readers. Many of these simply project the image from microfilm on a screen so that it can be viewed in enlarged form with the naked eye. The present film reader does this, but is also capable of greatly magnifying even the enlarged image upon actuation of control means, such as a toggle.

One of the principal objects of the present invention is to provide a film viewing machine with a viewing surface than can be used by draftsmen, architects, and engineers, in which microfilm is enlarged to scale over the entire viewing surface so that one inch measures one inch at the edge of the viewing surface and measures one inch in the center thereof. Another object is to provide control means for permitting the person viewing the image to greatly enlarge said image upon actuation of control means, such as a switch. Another object is to provide a viewing surface on which tracing paper may be placed and plans traced thereover both quickly and accurately to scale. Another object is to provide a single tie-rod arrangement for the cover and manner of forming the cooling air passages within the machine. Another object is to provide a compact construction for such a machine, so that it is not too bulky, and can be used conveniently next to a desk or article of furniture. Another object is to provide a film viewer having two movable mirrors within the cabinet to adjust the magnification of the image on the screen. Another object is to provide for limited movement of the lamp within the viewer upon movement of the movable mirrors. Another object is to provide a viewer which may also be used to expose an image on sensitive paper, which can thereafter be developed, thereby permitting enlarged prints to be made from the microfilm.

These and other objects and advantages will become apparent hereinafter.

The invention is embodied in a film viewing machine having selective magnification of the image and means for raising and lowering the mirrors within said viewer.

Figure 5:
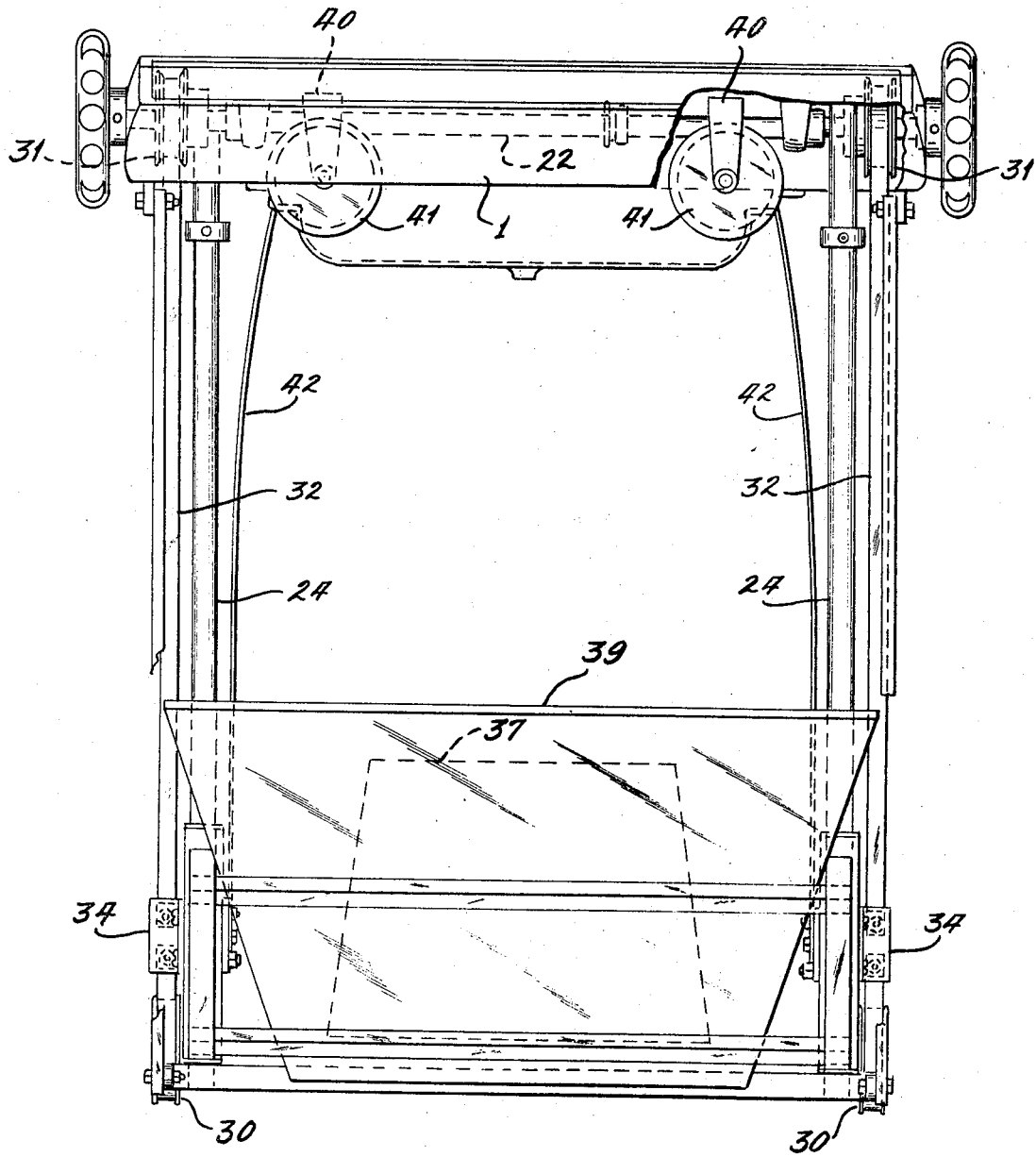
Figure 6:
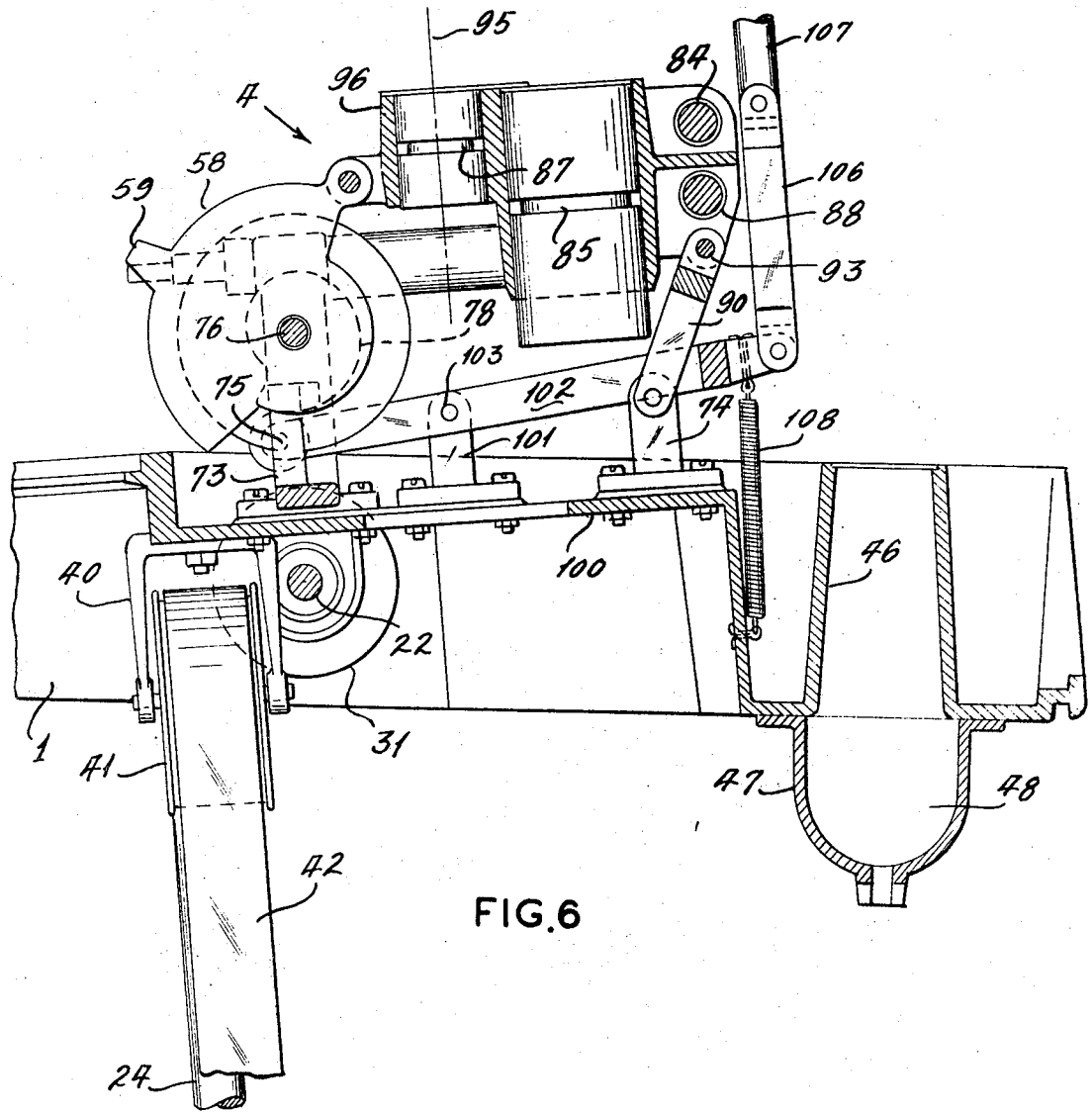
Figure 10:
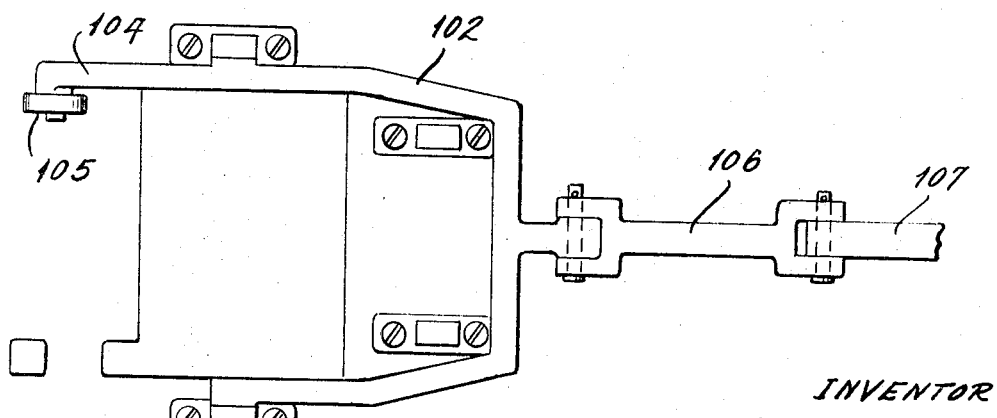

The invention also consists in the parts and in the arrangements and combinations of parts hereinafter described and claimed. In the accompanying drawings which form part of this specification and wherein like numerals and symbols refer to like parts wherever they occur:

FIG. 1 is a front elevational view of a film reader embodying the present invention, FIG. 2 is a left side elevational view thereof, FIG. 3 is a top plan view thereof, FIG. 4 is a fragmentary side elevational view of the mirror assembly frame and assembly post, FIG. 5 is a fragmentary front elevational view of the mirror assembly frame and assembly post, FIG. 6 is a fragmentary side elevational view of the magnification lens linkage in one position (30×), FIG. 7 is a top plan view of the lens linkage shown in FIG. 6, FIG. 8 is a front elevational view of the lens linkage shown in FIG. 6, FIG. 9 is a rear elevational view of the lens linkage shown in FIG. 6, FIG. 10 is a fragmentary top plan view of the cam follower and lamp post shown in a flat position, FIG. 11 is a fragmentary side elevational view of the optical train of said film reader assembled with the lens linkage flipped to its alternate position (15×), FIG. 12 is a fragmentary enlarged view of the central control panel, FIG. 13 is an exploded perspective view of the transport per se, and FIG. 14 is an exploded perspective view of the carrier.

Referring now to the drawings in detail, it will be seen that the embodiment of the invention which has been illustrated comprises a film reader or viewing machine R having a cabinet C with a top frame 1 and a sloping top 2 thereon and reflecting means or a movable mirror assembly M therein. A riser or electrical housing 3 is mounted on the top frame 1, which houses the lens frame or mounting 4. A lamp housing 5 having a projector lamp therein is positioned above the riser 3 and the lens mounting 4. A carrier 6 with a transport 7 therein is movably mounted on the riser 3 above the lens frame 4 and is adapted to receive microfilm which is to be enlarged and whose image will be projected onto the sloping top 2 of the cabinet C.

The cabinet C comprises a lower frame 8 with four upstanding corner members 9, said lower frame 8 having sockets 10 with wheels 11 mounted on casters 12. The cabinet C has a sloping front wall 13, two side walls 14 and 15, and a rear wall 16. The cabinet C is closed at its top by the top frame 1 which has the sloping top 2 and the riser 3 across the rear portion with the lamp housing 5 above the central portion thereof.

The sloping top 2 comprises a clear glass plate 17 over which a flat translucent panel 18 may be placed. The translucent panel 18 fits within a frame 19 which has a vertical wall 20 about ⅛″ high therearound adapted to retain said panel 18. The frame 19 has indentations 21 therein so that the panel 18 can be easily removed therefrom by inserting a fingernail or an object in the indentation 21 to grasp the panel 18 and lift it upwardly. The translucent panel 18 forms a reader screen about 14″ high and 20″ wide and can be made from plastic material, which may be Plexiglas or other suitable material, coated with a blue, green, or gray coating on one side. This colored coating permits the image to be viewed conveniently and with ease.

The top frame 1 has a rotatable shaft 22 extending therethrough with a handwheel 23 mounted on either end thereof. Rotation of one handwheel 23 rotates the shaft 22 and the other handwheel 23. A pair of shafts or posts 24, slightly inclined from the vertical and perpendicular to the sloping top 2, are mounted within the cabinet C. These posts 24 are mounted inwardly of the side walls 14 and 15 and are connected at their tops to the top frame 1.

The bottoms of the posts 24 are connected by a transverse bottom bar 25, which is also supported at each end by a slanted brace 26 which is connected to a bracket 27, which is part of the top frame 1. The bottom bar 25 supports a rotatable rod 28 mounted in bearings 29. The rod 28 is provided with a lower pulley 30 at each end.

The upper rotatable shaft 22 is provided with an upper pulley 31 at each end, which upper pulleys 31 are vertically aligned with the lower pulleys 30. A continuous belt 32 having teeth 33 therein is mounted around the lower pulley 30 and the upper pulley 31. The pulleys 30 and 31 have openings between teeth therein for receiving the teeth 33. The belt 32 is provided with an L-shaped bracket 34 which is secured to a mirror carriage or assembly M.

The mirror assembly M comprises a carriage 35 slidably mounted on the inclined shafts 24. The carriage 35 has support bars 36 which support a first or small mirror 37 in its rear portion near the rear wall 16 and support bars 38 which support a second or larger mirror 39 near the front wall 13. The mirrors 37 and 39 are positioned at an angle of 45° to the posts 24 and are perpendicular to each other. The mirrors 37 and 39 may have slanted edges, so that the top edge of the small mirror 37 is lesser in width than the bottom edge and the top edge of the larger mirror 39 is greater in width than the bottom edge (FIG. 5). The top frame 1 also has a bracket 40 at each side which supports a counterbalance assembly 41 having a rolled spring 42 therein. The lower end 43 of the rolled spring 42 is attached to the mirror assembly M and the spring 42 acts as a counterbalance for the weight of the mirror assembly M.

The top frame 1 also supports a fan 44 having a motor 45 thereon positioned within the riser 3. The top frame 1 has a vertical duct 46 and a horizontal housing 47 which forms a lower horizontal air duct 48, which connects with a vertical duct 49 in the riser 3, which in turn directs air into the lamp housing 5. The top frame 1 also supports the necessary wiring and electrical connections 50 for the electrically operated means in the riser 3 and the lamp housing 5.

The riser 3 is provided with a forward central wall 51, and has two forward side walls 52, two forward end walls 53, two higher rear side walls 54, a top wall 55 and a rear wall 56 having a filter 57 therein. The riser 3 has the vertical air duct 49 in its rear portion. The forward center wall 51 is provided with several controls, including a toggle switch 58 having a toggle pin 59 to choose different ranges of magnifications, such as 10 to 20× or 20 to 40× (hereinafter sometimes called 15× or 30× respectively), a low magnification window 60 with a left scale 60a therein and low magnification focusing knob 61, and a high magnification window 62 with a right scale 62a therein and a high magnification focusing knob 63, there being a transverse movement knob 64 thereabove. Different ranges of magnification can be provided if desired by providing the film reader R with different lenses.

The toggle 58 has a left shield 65 and a right shield 66 thereon. When the toggle pin 59 is in its lower position, the right shield 66 covers the right window 62, so that only the left scale 60a can be viewed, with numbers such as 10 to 20. In this position, the left shield 65 has been rotated downwardly to expose the left scale 60a, which shows the numerals 10 to 20 which represent the magnification of the microfilm. When the toggle pin 59 is in its upper position, the left shield 65 covers the left window 60, so that only the right scale 62a can be viewed, with numbers such as 20 to 40. In this position, the right shield 66 has been rotated upwardly to expose the right scale 62a, which shows the numerals 20 to 40 which represent the magnification of the microfilm. As the mirror carriage M moves up and down, the right and left scales 62a and 60a are rotated to present the proper numerals in the right and left windows 62 and 60, the numbers appearing in the left window 60 running from 10 to 20 to represent the magnification of the microfilm and the numbers in the right window 62 running from 20 to 40.

The riser 3 support the carrier 6 having the transport 7 on which the microfilm mounted on a card is placed. The carrier 6 has a traverse knob 64, and the transport 7 has a fore and aft knob 67 on either side thereof. The forward side wall 52 is provided with a dimmer knob 68 to control the brightness of the light on the sloping top 2, a fan switch 69 and signal light 70, and a light switch 71 and signal light 72.

The top frame 1 also supports the magnification lens linkage 4 which is housed within the riser 3. The magnification lens linkage 4 (FIG. 6) is mounted on a forward bracket 73 and a rear bracket 74. The forward bracket 73 has two upstanding arms 75 which support a support rod 76 on which are mounted the toggle switch 58, the lower magnification scale 60a, the higher magnification scale 62a, a gear 77, and a cam 78. The upstanding arms 75 each have a shaft 79 thereon for receiving the low and high magnification focusing knobs 61 and 63. Each shaft 79 has a roller or eccentric 80 mounted off-center thereon. A pin 81 is mounted in contacting relation with each roller 80. One pin 81 is mounted to a post 82 which is secured to the lower pin 88. The other pin 81 is mounted on post 82 secured to an upper bar 83 pivotally mounted on an upper pin 84 at its rear end. Rotation of the left or lower magnification knob 61 causes vertical movement of the magnification lens 85 within its housing 85a due to the lower bars 86 being pivoted upwardly as the left eccentric 80 moves the left pin 81 upwardly. Rotation of the right or high (30×) magnification knob 63 causes vertical movement of the small or high magnification lens 87 within its housing 87a due to the upper bars 84 being pivoted upwardly as the right eccentric 80 moves the right pin 81 upwardly. The lower bars 86 are pivotally mounted on a lower pin 88. The pins 84 and 88 have springs 89 therearound to bias the lenses 85 and 87 in a normal position. The rear brackets 74 have an H-shaped link 90 pivotally mounted thereon on pins 91. A toggle spring 92 is mounted between the H-link 90 and the top frame 1. The upper end of the link 90 supports a pin 93 on which the rear of lens frame 4 is pivotally mounted. The forward end of the lens frame 4 connected to the toggle 58 by a pin 94. The toggle 58 has a pin or finger post 59 thereon. With the finger post 59 in the upper position (FIG. 6), the lens frame 4 is in its rear position with the small (30×) lens 87 on the major optical axis 95 of the machine. With the finger post 59 pivoted to its lower position (FIG. 11), the lens frame 4 is in its forward position with the large (15×) lens 85 on the major optical axis 95. The lens frame 4 contains the small but high (30×) magnification lens 87 on its forward portion 96 and the larger but low (15×) magnification lens 85 at its rear portion 97. Each lens 85 and 87 can be moved vertically along the major optical axis 95 within its housing 4 in order to focus the image on the sloping top 2.

The gear 77 imparts rotation to the rod 76 on which it is mounted by reason of the gear chain 98 which is moved in either direction by a pinion 99 on the rotatable shaft 22. The size of the gears 77 and 99 is important since the left and right scales 60a and 62a must be properly calibrated to accurately show the magnification of the microfilm on the sloping top 2.

The flange 100 in the top frame 1 also supports a central bracket 101 having upstanding arms which pivotally receive a cam follower 102 on pins 103. The cam follower 102 has an elongated arm 104 which extends forwardly and supports a small roller 105 which is in contacting relation with a circular segment or cam 78 on the rod 76. The rear of the cam follower 102 is pivotally secured to a lamp link 106, which is pivotally secured to a lamp post 107. The rear of the cam follower 102 is biased downwardly by a lamp return spring 108 connected to the top frame 1. The upper end of the lamp post 107 has a lamp support 109 and a collar 110 adjustably mounted thereon by means of the cap screw 111. The lamp support 109 receives a projector lamp 112.

The projector lamp 112 is movably mounted above a condenser assembly 113, which comprises an upper lens 114, a central lens 115 or heat filter, and a lower lens 116. The condenser 113 is suitably mounted in a condenser housing 117 in the lamp housing 5, which has a lower fixed portion 118 and a hinged lamp cover 119 having a large cavity 120 therein and having a top wall 121 with air openings 122 therein. The lamp 112 is moved up and down as the magnification is changed to give maximum uniformity of light on the sloping top 2. Without moving the lamp 112 toward and away from the condenser 113, dark spots may appear on the sloping top 2 near the edges thereof.

The lamp housing 5 has a flange 123 therein with a hole for receiving a tie rod 124 which is also secured to the housing 47 on the top frame 1. The tie rod 124 extends through the ducts 46 and 49 and connects the lamp housing 5, the riser 3, and the top frame 1 together. This arrangement also forms a continuous passageway for air to cool the lamp 112, since the motor 45 runs the fan 44 which forces air through the horizontal housing 47, the duct 46 in the top frame 1, the duct 49 in the riser 3, and the cavity 120 in the lamp housing 5, which cools the lamp 112 before moving out through the openings 122 in the top wall 121 of the lamp housing 5.

The microfilm carrier 6 is mounted so that it can be moved transversely on the riser 3 by rotating the traverse knob 64. The carrier 6 has a transport 7 thereon which can be moved fore and aft by rotating one of the fore and aft knobs 67. The carrier 6 has a frame 125 having a traverse rod 126 with a rack or teeth 127 on its underside. The traverse knob 64 has a shaft with a small traverse gear 128 thereon with teeth which mesh into the teeth 127 of the traverse rod 126. Thus, rotating the traverse knob 64 moves the traverse rod 127, frame 125, and carrier 6 laterally or transversely with respect to the riser 3.

The transport 7 has a frame 129 with front and rear members 130 and guide rails 131 along each side which fit into guide rails 132 on the carrier 6. The edges of the bottom of the guide rails 131 have teeth 131a therein which engage with teeth 133 on a gear 134 connected to the fore and aft knobs 67. Thus rotating the tops of the knobs 67 forwardly moves the transport 7 toward the person, and rotating the tops of the knobs 67 rearwardly moves the transport 7 rearwardly and away from the person. The transport 7 has a lower glass plate 135 secured thereto and an upper glass plate 136 pivotally mounted thereon.

The transport 7 is prevented from moving fore and aft too far by stop means, which in effect are the ends of the guide rails 131. The carrier 6 is prevented from moving laterally too far by stop means, which in effect are the ends of the traverse rod 126. These stop means limit the lateral movement and the fore and aft movement of the carrier 6 and the transport 7 therein.

If desired, the carrier 6 can be provided with inclined supports (not shown) having a reel and a crank thereon for receiving a roll of microfilm instead of individual cards which hold one or more frames of microfilm. With either cards or rolls of microfilm, the microfilm is positioned between the glass plates 135 and 136 on the transport 7 and moved to a proper position therein so as to intersect the major optical axis 95 which permits the image from the microfilm to be projected on the sloping top 2.

In operation, as a handwheel 23 is rotated, the shaft 22 rotates and causes several actions simultaneously. First, it causes the mirror assembly M to move up or down to change the magnification or the size of the image on the sloping top 2. As the mirror assembly M moves up and down, the spring 42 winds or unwinds from the counterbalance 41. This type of counterbalance 41 replaces heavy counterbalance weights, which require proper support and add weight, expense, and additional shipping charges. The counterbalance 41 simply compensates for the weight of the mirror assembly M, so that the handwheels 23 may be rotated with ease.

Secondly, as the handwheel 23 and shaft 22 are rotated, the pinion 99 in the central portion of the shaft 22 is rotated, thereby moving the chain 98 which rotates the gear 77 mounted adjacent to the high (30×) magnification scale 62a on the rod 76 so that both scales 60a and 62a rotate to inform the viewer of the magnification which he is seeing on the sloping top 2.

Thirdly, the gear 77 rotates the rod 76 and the cam 78 thereon, which causes the roller follower 105 on the forward portion of the cam follower 102 to move said forward portion down as the mirror assembly M moves down. This causes the rear of the cam follower 102, the lamp link 106, the lamp post 107, and the lamp 112 to rise. Conversely, as the mirror assembly M moves up, the forward end of the cam follower 102 moves up which moves the rear end of the cam follower 102, the lamp link 106, the lamp post 107, and the lamp 112 down to its lower position. The rear of the cam follower 102 is biased downwardly by the spring 108, whose lower end is attached to the top frame 1. This biases the roller follower 105 upwardly against the cam 78 on the rod 76. Moving the top of the handwheels 23 forwardly toward the person causes the mirror assembly M to move down and causes the magnification to increase. Moving the top of the handwheels 23 rearwardly or away from the person causes the mirror assembly M to move up toward the sloping top 2 and causes the magnification to decrease. Moving the toggle pin 59 simply shifts the lens mounting or frame 4 (FIGS. 6 and 11), but does not move the cam segment 78 on the rod 76, or the roller follower 105, or the mirror assembly M.

Moving the top of the handwheel 23 forward toward the person increases magnification and raises the lamp 112 from the condenser 113 so that the space therebetween is a maximum of about 1.5″ when the magnification is 40× when the toggle pin 59 is up, or 20× if the toggle pin 59 is down. At 30× when the toggle pin 59 is up, or 15× when the toggle pin 59 is down, this space between the lamp 112 and condenser 113 is about 1″. At 20× when the toggle pin 59 is up, or 10× when the toggle pin 59 is down, this space between the lamp 112 and condenser 113 is about 0.5″. Of course, these distances may vary if the dimensions of the machine are changed or if different intensities of lamp bulbs are used or if different kinds of condensers are used.

The film reader R can be used to make prints. In order to do this, the microfilm is placed in the machine upside down. The translucent panel 18 is placed on the sloping top 2 and the image is magnified to the desired amount by moving one of the handwheels 23 (both rotate together) until the proper magnification is indicated on one of the scales 60a or 62a. The reversed image is then brought into focus by moving the proper knob 61 or 63, and the lamp 112 is brought to a predetermined brightness by rotating the dimmer knob 68. After the image is in focus, the lamp 112 is turned off and the panel 18 is lifted and a piece of light sensitive paper is placed directly on the clear glass plate 17 of the sloping top 2. The panel 18 is then placed over the light sensitive paper to keep the paper flat. The lamp 112, which is already at a predetermined brightness is then turned on for a predetermined time by flipping the light switch 71. The lamp 112 is left on for a predetermined time, depending upon the characteristics of the paper, to expose the paper to the image for said predetermined length of time. The exposed light sensitive paper is then removed and developed on a suitable developer, not shown. This may be the usual type of wet process developer which is in common use today to develop light sensitive paper.

The two lenses 85 and 87 are used so that the image can be shifted from large magnification (30×) to small magnification (15×) without refocusing. In actual use, the use flips the toggle pin 59 up and down between 30× and 15×. At 15×, the user can see a larger portion or area of a print on microfilm. If he wants to see an enlarged portion of the print, he can shift to 30× in order to see greater detail. He can shift to the particular portion of interest by moving the traverse knob 64 and one of the fore and aft knobs 67 on the carrier 6. The magnification of 30× and 15× are used simply as an illustration, it being understood that if the person is viewing an image at 10×, flipping the toggle pin 59 will produce an image of 20× and if the person is viewing an image at 20×, flipping the toggle pin 59 will produce an image of 40×.

The two lenses 85 and 87 are far less expensive than a zoom lens and have advantages thereover.

To use the film viewer after it has been connected to a source of electricity, the user turns on the lamp 112 by flipping the lamp switch 71 and also turns on the fan 44 by flipping the fan switch 69. These can be connected or arranged so that the lamp 112 cannot be turned on without turning on the fan 44, which provides the necessary cooling.

The microfilm to be viewed is then placed in the carrier 6 between the plates 135 and 136. The toggle pin 59 at this point is preferably in its lower position so that the left scale (15×) can be viewed. In this position, the lens 85 is moved to coincide with the major optical axis 95. This allows the person to see the entire image on the microfilm, since the size of the image has been previously determined so that upon 15× magnification it will completely fill the 14" x 20" slopping top 2.

The microfilm may be manually moved between the plates 135 and 136 until it is substantially on the major optical axis 95. The traverse knob 64 is rotated to move the carrier 6 left or right until the image appears on the sloping top 2 in the exact lateral position desired. The fore and aft knob 67 is then rotated to bring the image between the top and bottom edges of the sloping top 2. The knob 61 or 63 can be rotated to make the image clear on the sloping top 2.

The person can then view what is on the microfilm, since light passes from the lamp 112 through the microfilm to the first mirror 37 where it is reflected to the second mirror 39 from which it is reflected up to the sloping top 2. Should the person wish to see an enlargement of a portion of the microfilm, such as with complicated or detailed wiring diagrams or the like, he can obtain an immediate enlargement by flipping the toggle pin 59 to its upper position to provide 30× magnification, which in effect enlarges that portion of the image to a size twice as wide and twice as high, or four times the area size, of what it was previously under the 15× magnification when the toggle pin 59 was in its lower position.

This invention is intended to cover all changes and modifications of the example of the invention herein chosen for purposes of the disclosure which do not constitute departures from the spirit and scope of the invention.

What is claimed is:

1. A film viewer for magnifying and projecting an image from microfilm, said film viewer comprising a cabinet having a top frame wth a viewing surface thereon, a carrier mounted on said film viewer for lateral movement thereon, said carrier having a transport thereon adapted to move fore and aft, projection means and enlargement means for projecting and enlarging the image from said microfilm and directing said image to said viewing surface, said projection means including a lamp and a condenser, said lamp being adapted to move toward and away from said condenser, said enlargement means comprising at least two magnification lenses mounted in a lens frame, said lens frame being movably mounted on and in pivoting relation with respect to the top frame and the major optical axis of said film viewer, switch means on said film viewer for selectively placing one of said lenses on the main optical axis to control the magnification desired, said enlargement means including reflecting means connected to a carriage which is movable toward and away from said viewing surface, said carriage having reflecting means thereon to reflect the image from the microfilm to the viewing surface and to change the magnification thereof as the carriage moves toward and away from said viewing surface, and means for moving said lamp toward and away from said condenser.

2. The combination set forth in claim 1 wherein each magnification lens is slidably mounted within the lens frame to adjust the focus of the image on the viewing surface, the focusing means for each lens being capable of being operated independently of the other.

3. The combination set forth in claim 1 wherein a toggle arrangement is used to move the lens frame to place one or the other of said lenses along the main optical axis of the machine, each of said lenses having an optical axis which is parallel to the main optical axis of the film viewer at all times.

4. The combination set forth in claim 1 wherein said lamp moves downwardly toward said condenser and said microfilm as said carriage moves upwardly toward said viewing surface, and wherein said lamp moves upwardly away from said condenser as said carriage moves downwardly and away from said viewing surface.

References Cited

UNITED STATES PATENTS

| 2,742,815 | 4/1956 | Dietrich et al. | 353—76X |
| 2,746,344 | 5/1956 | Pratt et al. | 353—76 |
| 2,878,718 | 3/1959 | Post | 353—76 |

FOREIGN PATENTS

| 218,409 | 4/1942 | Switzerland | 353—76 |

WILLIAM D. MARTIN, JR., Primary Examiner

U.S. Cl. X.R.

353—101; 355—45